Sept. 7, 1926.

C. C. EDDY

VEHICLE TOP

Filed May 17, 1923

C. C. EDDY 1,599,082

VEHICLE TOP

Filed May 17, 1923

INVENTOR
Charles C. Eddy
BY
D Ellison Thompson
ATTORNEYS.

Patented Sept. 7, 1926.

1,599,082

UNITED STATES PATENT OFFICE.

CHARLES C. EDDY, OF CORTLAND, NEW YORK, ASSIGNOR TO THE BREWER-TITCHENER CORPORATION, OF CORTLAND, NEW YORK, A CORPORATION OF NEW YORK.

VEHICLE TOP.

Application filed May 17, 1923. Serial No. 639,541.

This invention pertains to a new and improved vehicle top particularly designed for use in connection with automobiles altho it may be used in various other associations.

The main objects of the invention resides in the production of a comparatively light but strong and firm structure of what may be generally called a permanent non-collapsible top that can if desired be manufactured and shipped in sections, and is readily and easily assembled to form a completed top structure, and in which the rails or arms constituting portions of the structure are sufficiently flexible to be made to conform to the contour or lines of any body on which the top structure is assembled.

In a permanent top of the type to which the present invention relates, lightness of structure constitutes an essential requirement. Such tops are found to give most satisfactory service when the frame structure is not made too rigid and is given a limited inherent flexibilty whereby to provide for the necessary shock-absorbing capacity to take up the road jolts. The novel arrangement of frame parts disclosed herein combines the necessary strength with stability of structure for this purpose, and thus insures against loosening of the frame joints as well as undue lateral swaying of the frame with respect to its body mounting.

In the event that these effects are not properly provided against, the frame covering material would not remain tautly stretched in place after an extended period of service and the resulting slackening of the back curtain fabric would allow of whipping on part of the rear curtain light frame. As a consequence a disagreeable rumbling noise is likely to be set up within the top enclosure, besides greatly depreciating the appearance and useful life of the top structure. The present invention aims to overcome these defects and provide for improved means to meet this need.

Further the invention has for an object the production of a new form of top construction provided with improved side rails having cross rails and a main support and outrigger thereof which possesses novel construction features applicable to either a collapsible top or a permanent top. All of these parts are preferably made of substantially uniform rectangular shape, and are provided with a strip or strips of sheet metal bent into proper tubular form having a wood filler, the longitudinal edges of the metal strip or strips being spaced apart to form a longitudinal slot or opening between said edges of suitable width to constitute a longitudinal tacking surface for securement of a covering material to the wood filler, which filler is sheathed by the incomplete tube of metal.

Detailed objects relate to the particular asemblage and association of the side rails and cross bows together with the bow supports therefor and the particular methods of reinforcing the structure at desired points, and of connecting the sectional parts together, and in a specific instance to the particular construction and assemblage of a novel metal encased wood bow structure capable of use as a portion of this invention.

Other objects and advantages relate to the details of form, construction and arrangement of the parts, all as will more fully appear from the following description, taken in connection with the accompanying drawings, in which:—

Figure 8:
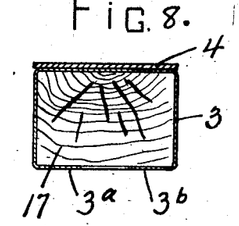
Figure 8 is a section on line 8—8, Figure 2.
Figure 9:
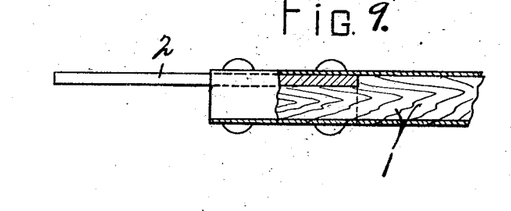
Figure 9 illustrates the connection of the pivot iron bracket to the main arm or standard.

The structure of top here shown as an illustrative embodiment of my invention comprises a main bow support or arm —1— having a pivot iron —2— at its lower end for securement to a vehicle body (not shown). This bow support —1— carries at its upper end portion a bow-receiving socket —3— in the form of an incomplete tube, and may be produced by bending a strip of said metal of proper size and form into an incomplete tube of desired shape, as for instance, substantially square or somewhat rectangular, as shown in Figure 8, with its edges 3ª and 3ᵇ spaced apart to form a slot or opening along one side of the tube to produce a slightly resilient socket or receiver adapted to accommodate any reasonable limits of tolerance in the size and shape of the end of the bow to be inserted within said socket.

Figure 2:
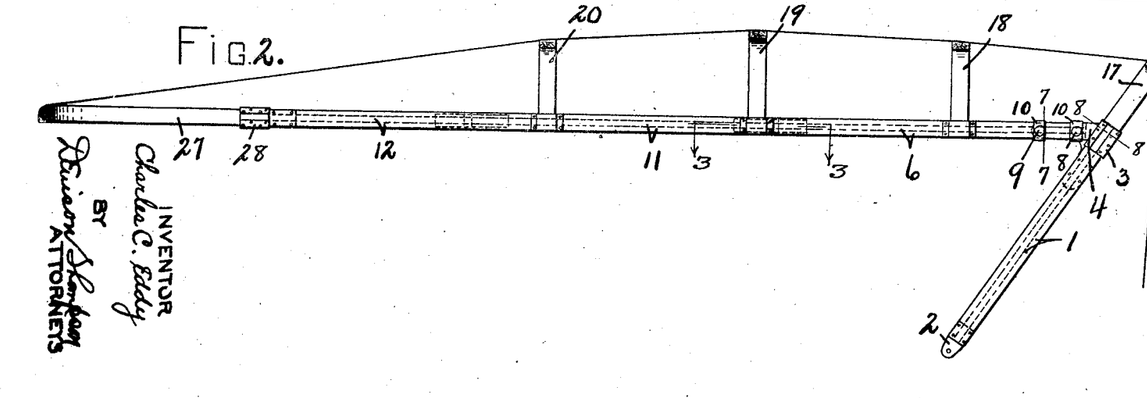
Figure 2 is an elevational view of the same taken in section.
Figures 10, 11, 17:
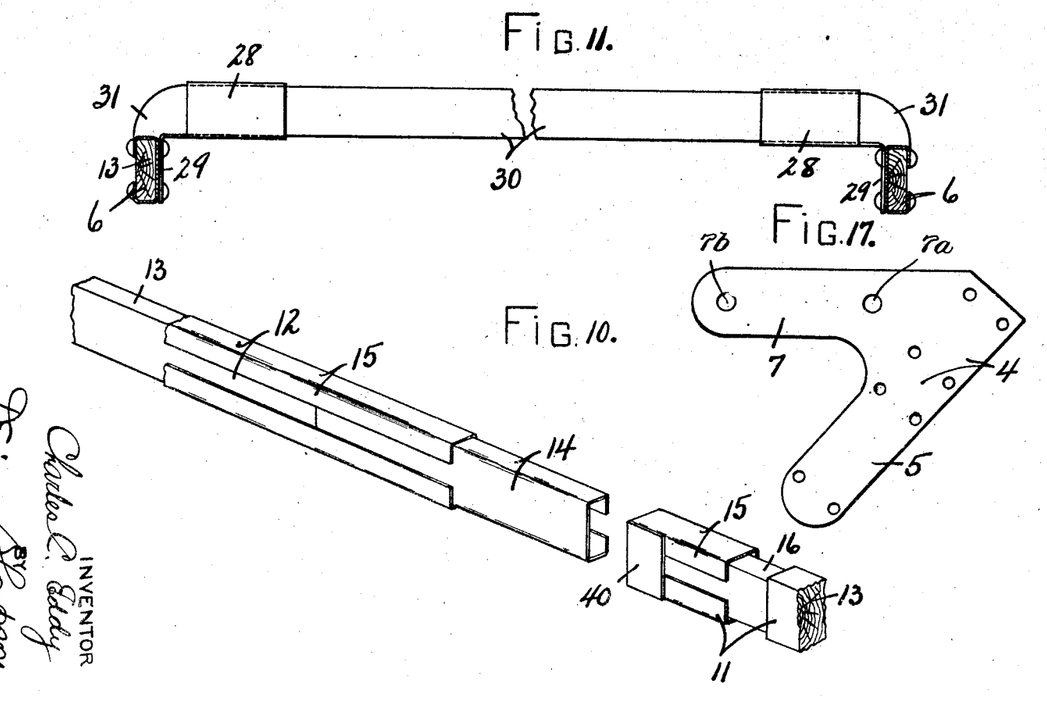
Figure 10 illustrates a portion of two of the sections of the side rail support.
Figure 11 illustrates the method of forming a substantially flat or full clear vision top with the structure of my invention.
Figure 17 illustrates the bracket plate for securing the upper end of the main bow to the side rail structure.

As is best shown in Figures 2 and 17, a bifurcated bracket plate —4— has one leg —5— resting in contact with and secured to the upper end of the bow support —1— and the resilient socket —3— is secured to this bracket —4— above the end of the bow —1— and with the open slot of the socket set away from the bracket. The rear section —6— of a sectional side rail has its rear end connected to the other leg —7— of the bracket —4—. Preferably, as shown, this connection is made by means of a rivet —8— about which the section may swivel and a bolt —9— capable of being removed to permit such pivotal movement when it is desired to collapse this portion of the structure, as for instance for the purpose of compactly stacking the side rails in transport or storage. In that event, the detachable bolt —9— is removed and the free end of the main arm —1— may then be swung freely about the rivet 8 and made to lie alongside of the side rail axis.

Figure 7:
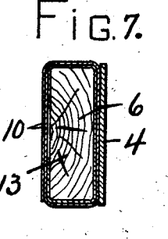
Figure 7 is a section on line 7—7, Figure 2.

The rivet —8— and the bolt —9— both extend through the section —6— and through openings 7ª and 7ᵇ respectively in the arm —7— of the bracket —4ª—. For the purpose of reinforcing this connection, the section —6— at these points where the rivet and the bolt pass through it, is provided, as shown in Figure 7, with a strip of sheet metal —10— bent completely around the section —6— to form a sleeve and having one end overlapping the opposite end preferably an amount equal to the complete width of one side of the section —6—, and preferably this overlapping relation is had upon the side of the section —6— that is formed with the tacking slot or opening to be hereinafter further described.

It will be apparent that the outrigger section —27— of my permanent top structure is intended to be supported in the usual manner by the windshield stanchions or side arms (not shown). The forward ends of the respective side rails are intended to rest upon said stanchions while the rearward ends of said rails are respectively fastened to the pair of main arms —1—. It is pointed out that the improved bracket plate —4— serves to lock the arm —1— in any predetermined angular relation with respect to the side rail whenever the bolt —9— is inserted in place. Proper longitudinal rigidity against lateral displacement with respect to the vehicle body is therefore imparted to the top structure by said locked bracket plates and this is supplemented by the lateral bracing of the windshield stanchions. These parts constitute a relatively stiff and well braced structural unit which is well adapted to take up the inertia thrusts or reactions upon the top parts that may be due to road jolts or other causes.

As stated, the side rail or member of the top structure is formed in sections, in this instance three separate sections —6—, —11— and —12— which are fastened together endwise by suitable sleeve means. Preferably these sections are of substantially the same form and construction and their size may be the same, or may vary in accordance with the size of the top desired, and the number of sections of which it is desired to form a complete side rail. These sections are connected together and held in alignment by having a portion of one, which expression is deemed to include a portion rigidly connected to one, telescoped with the other section. In this illustration, the telescopic arrangement is internal.

Each of the sections —6—, —11— and —12— as well as the main arm —1— are formed in the same manner and are preferably of the same size, altho the main arm may differ in cross section should that be desired, for obtaining additional strength. Each of these sections and the main arm are formed of a strip or strips of sheet metal bent about the wood inserts such as 13 into the form of a slotted sleeve or tubular structure —15— preferably of substantially rectangular cross section, and having the edges of the strip spaced apart so that the tube is incomplete and the wood filler —13— is exposed through the opening or slot between the spaced edges, as perhaps best shown in Figure —10— to form a tacking surface into which tacks may be driven through the slot or opening without having to pierce the metal casing in order to secure the fabric or other covering for the top structure to the wooden insert —13—.

In the manufacture of the described side rail and similar sections, the tube sheets are preferably bent into a U or channel shape, whereupon the wood filler is placed into the bottom of said channel recess. The relatively long channel legs are intended to project beyond the filler somewhat so as to allow of being crimped over the filler edges and snugly encase the same in a manner that provides for a lengthwise tacking slot between the inner edges of said crimped legs.

Figure 5:
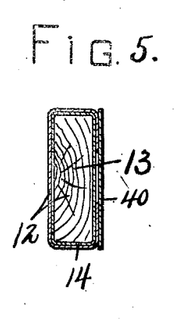
Figure 5 is a section on line 5—5, Figure 1, illustrating constructive details of the side rail.

The specific means for connecting the separate metal encased wooden sections —6—, —11— and —12— as illustrated and hereinbefore described, is effected by means of an incomplete metallic tube —14—, of the same shape in cross section as the metallic sleeves —15—. This tube —14— is inserted within one end of one of the sleeves —15— with its slot or opening toward the opposite side from that toward which the slot in the rail tube —15— opens, and the end of the wooden insert —13— is reduced as best shown at —16—, Figure 10, a sufficient amount to receive the connecting member —14— between it and the enclosing incomplete tube —15—. The tube —14— may be secured to one of the sections —15— during manufacture as by spot welding or the like, and when inserted within the end of the adjacent rail so that the ends of the wooden inserts of the two rails, as for instance —6— and —11— abut against each other, the connecting section —14— may be secured in any suitable manner to the other rail section if that is desired. The end of the rail section into which the member —14— is to be inserted as the rail 11, in Figure 5, is reinforced and strengthened by a strap —40— extending across the side having the locking slot and secured to the opposite edges of the incomplete tube —15— in any suitable manner, as by spot welding to form a solid tube. This method of connecting the sections is utilized throughout the structure. The rear bow —17— has its end inserted in the bow-receiving socket —3— and provision is made for receiving and retaining the remaining bows —18—, —19— and —20— in the form of sockets or stake pockets on the side rails, and a description of one of these sockets will serve as a description of all.

Figure 3:
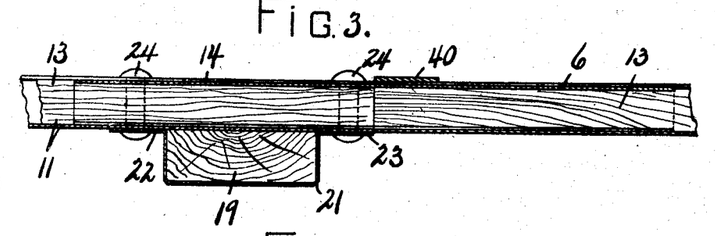
Figure 3 is a section on line 3—3, showing details of the stake pocket for attaching the leg of the cross-bow to the side rails.
Figure 6:
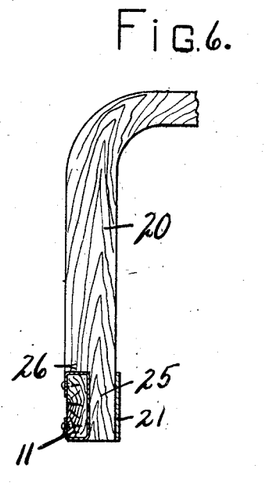
Figure 6 is a section on line 6—6, Figure 1, showing another view of the stake pocket detail.

A substantially U-shaped clip or stake pocket —21— is utilized as perhaps best illustrated in Figure 3 and provided with flanges —22— and —23— extending in opposite directions from the ends of the U-shaped clip, such flanges being secured in any suitable manner to the desired portion of one of the side rails, as by means of bolts or rivets —24—. In the particular illustration of Figure 3, it happens that these bolts —24— extend through the side rail —11— at the place where the reinforcing tube —14— is positioned within the section —11—. For that reason the bolts —24— serve to secure the connecting member —14— to the section —11— and no additional securement is required, but in the use of other connecting members —14— where the bracket —21— which forms the bow-receiving socket is not positioned at the point of connection of two sections, other securement as for instance spot welding, may be preferably utilized. In Figure 6 the method of assembling a bow, as the bow —20— with a side rail as the section —6— thereof, is illustrated in that the lower end of the bow —20— is reduced so as to form a male portion —25— adapted to fit within the stake pocket —21— and a second shouldered portion —26— which extends across the section —6— and rests thereon so as to form a vertical support for the bow while the section —6— and the stake pocket —21— form a lateral support, preventing lateral movement of the bow. In this construction, the outer surface of the bow —20— is substantially flush with the outer surface of the rear section —6— and a strong firm support for the bow is produced.

Figure 4:
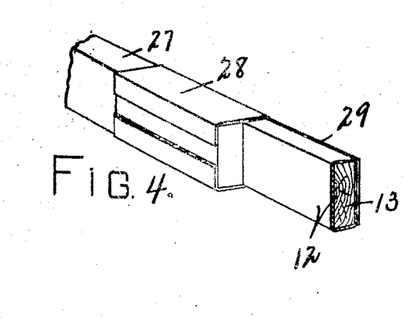
Figure 4 is a section on line 4—4, Figure 1, showing the side-rail and its fastening to the outrigger bow.

For the purpose of connecting the outrigger bow —27— to the forward end of the side rails of the frame, that is, to the sections —12— thereof, rail receiving sockets —28— similar to the socket —3— are produced with the additional feature that these resilient sockets are formed with an integral flange —29— as perhaps best shown in Figure 4 which extends along the side of the section —12—, and is secured thereto in any suitable manner as by rivets or the like as indicated in Figure 2.

This construction of top may be formed of comparatively light and small side rails which can be shipped in sections and later easily assembled to conform to any desired shape of vehicle body with the further advantage of the provision of a tacking space for securement of the top fabric to the wooden insert, and thereby obviates many disadvantages of present top constructions.

In Figure 11 a construction is shown which permits the production of a full clear vision top using sharply bent cross bows that is not materially raised above the side rails formed of the sections —6—, —11— and —12—. Instead of using the stake pocket —21—, the side rails are equipped with bow-receiving sockets which may preferably be formed like the socket —28—, except that the flange —29— is turned at an angle in this illustration substantially a right angle to the axis of the socket and the flange is secured flatwise to the rear section —6— or such other sections as may be desired so that the axis of the socket —28— extends laterally of the vehicle and adapts it for receiving the ends of a substantially straight cross bow —30— which may have its ends —31— shaped, as for instance, along arcuate lines shown to produce an uninterrupted contour between the side rail —6— and the cross bow. It will be obvious that any particular inclination of the socket —28— may be had for producing the desired shape of structure.

Figures 12, 13, 14, 15, 16:
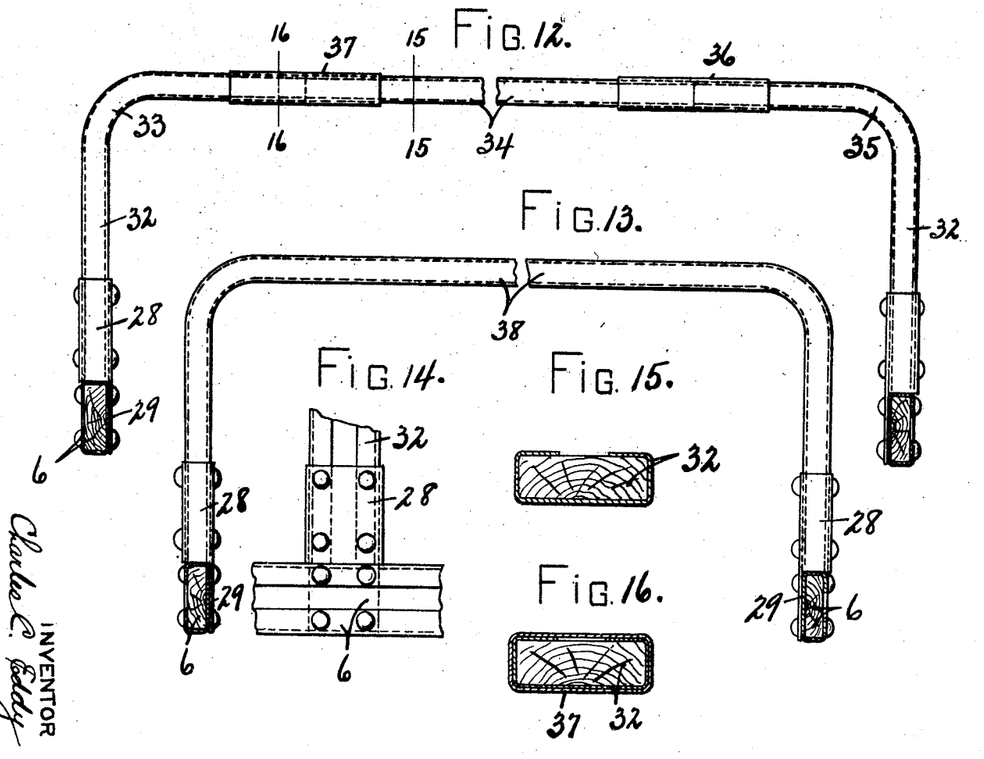
Figure 12 illustrates a novel form of cross bow and its assemblage with a supporting side rail structure.
Figure 13 is a view similar to Figure 12 of a slightly modified form of cross bow.
Figure 14 is a side elevation of the side rail and bow-supporting bracket and bow of Figure 12 and also illustrating a modified type of clip attachment between the cross bow legs and the side rail.
Figure 15 is a section on line 15—15, Figure 12.
Figure 16 is a section on line —16—16—, Figure 12.

In Figures 12, 15 and 16 a novel formed cross bow is illustrated in that it is formed in exactly the same manner as the side rail sections, for instance, the section —6— of a strip of sheet metal bent into the form of an incomplete tube or slotted sleeve and with its edges separated along the outer surface to expose a tacking surface of the enclosed wooden insert to which the top material may be secured.

In this construction, the lower ends of the cross bow —32— rest flatwise upon the upper surface of the side rails —6—, —11— or —12— and are secured in that position by means of socket which may be identical with the socket —28—, except perhaps so far as size is concerned with the flange —29— resting flat-wise against the side of the section —6— and the socket —28— extending across the upper edge of the section —6—. The section —6— and the cross bow —32— may be secured to the flange —29— and its socket —28— respectively by rivets or otherwise, as desired.

In Figure 12 the cross member of the cross bow —32— is shown, as formed of three sections —33—, —34— and —35— which may be connected together in any suitable manner, as by sleeves —36— and —37—, the sleeve —36— being telescoped externally with the adjacent abutting end portions of the sections —34— and —35— and secured to one or more sections in any suitable manner, as by spot welding or the like, while the sleeve —37— is telescoped externally with the sections —33— and —34— and may be secured to one or both in any suitable manner, as by spot welding. Altho the connecting sleeves —36— and —37— are here shown as externally telescoped with the sections, the internally telescoped connection illustrated in Figure 10 may be utilized in this construction to accomplish the same purpose. In Figure 13 a modified form of bow is shown in that the cross bow —38— is not formed in sections, but is a continuous integral structure, altho it will be obvious that it is not essential that it should be formed of a single piece of material.

Figure 1:
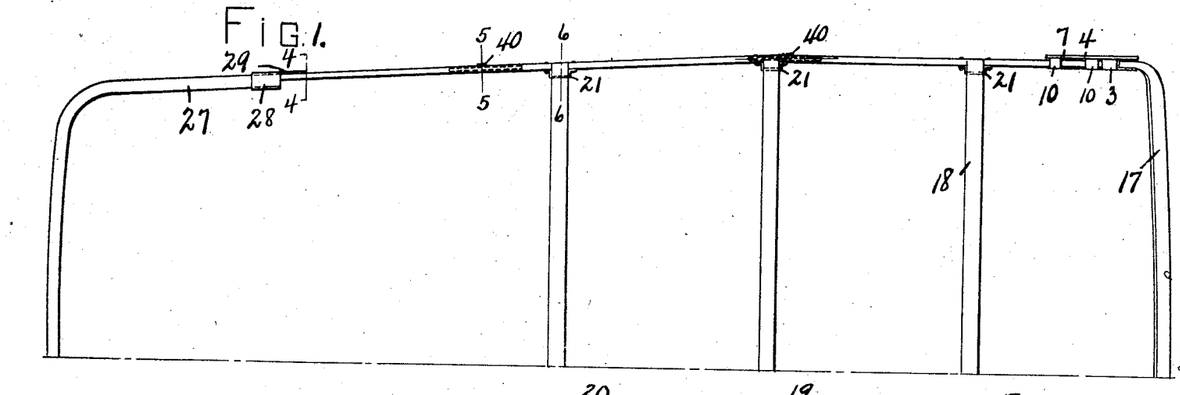
Figure 1 is a top plan view of one-half of a top structure of my invention.
Figures 18, 19, 20:
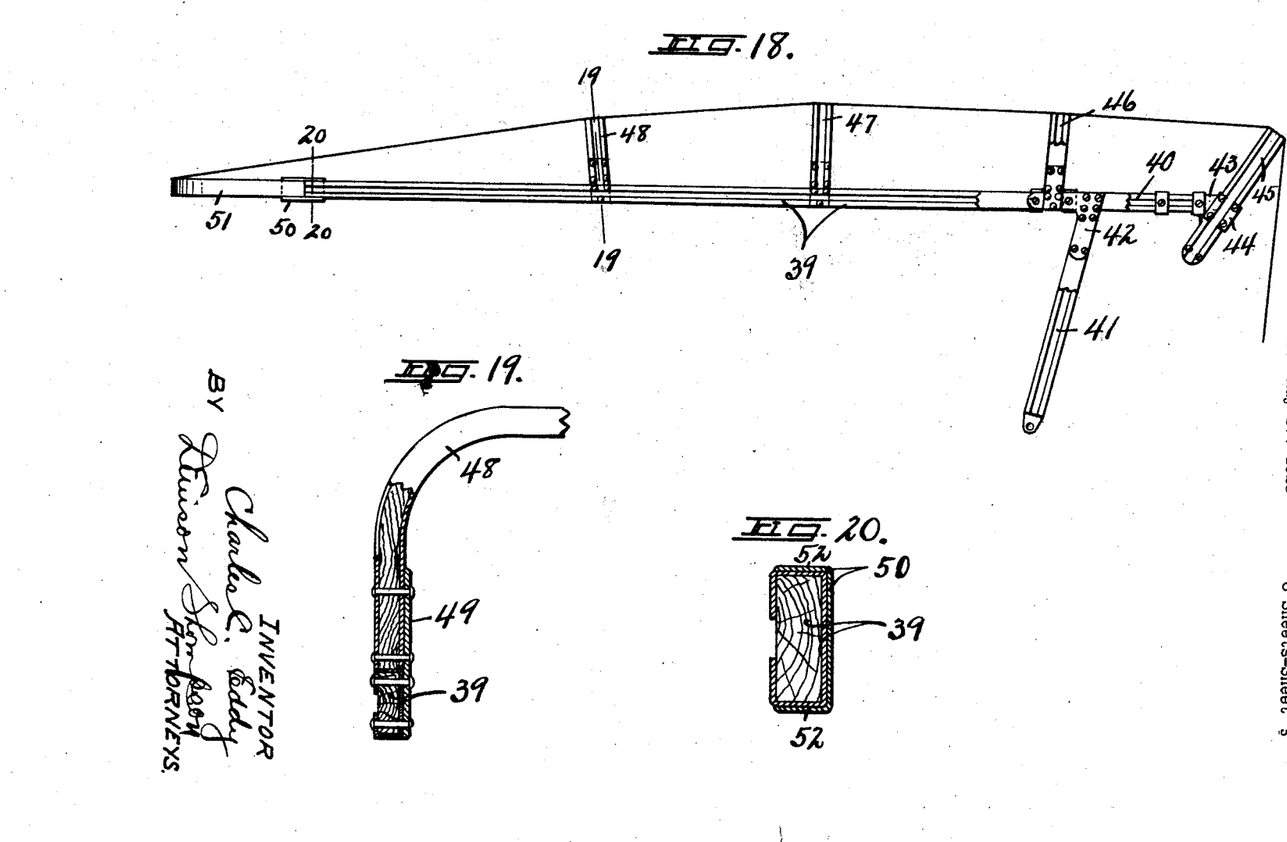
Figure 18 illustrates a similar form of top structure in which the side rails are each formed continuous or of integral strips.
Figure 19 is a section on line —19—19—, Figure 18.
Figure 20 is a section on line 20—20, Figure 18.

In Figure 18 I have illustrated a sectional top structure of form substantially like that shown in Figures 1 and 2, except, first that the side rails —39— are not formed in sections, but instead are formed of one continuous rail consisting of a single strip of material of the same form and construction as the sections —6—, —11— and —12— of Figure 2. In other words, one incomplete metallic tube is utilized for each of the longitudinal side rails —39—, and this continuous unbroken side rail has a filling of wood, as illustrated in connection with Figures 1 and 2. This illustration is given for the purpose of indicating that the side rail of Figure 2 need not be formed of sections, but that the sections —6—, —11— and —12— may be incorporated in a single continuous uninterrupted rail which subject matter has been more specifically embodied in my divisional co-pending application Serial No. 706,025 filed April 12, 1924.

Furthermore in the structure shown in Figures 1 and 2, the main bow is attached to the rear end of the side rail, while in Figure 18, I have illustrated a structure in which the rail —39— which may be either a continuous unbroken rail, as shown, or a sectional rail as indicated in Figure 2, but in either case, said rail 39 may be provided with a portion —40— extending some distance to the rear of the connection between the main arm —41— and the side rail —39— to form a partially balanced structure with respect to the support arm 41. The bracket plate —42— for connecting the main arm —41— to the side rail —39— is in form and construction substantially like the bracket plate 4 of Figure 17. An additional bracket plate —43— of the same form and construction as the bracket plate 4, Figure 17, is connected to the rear end of the section —40— of the extended rail —39— and is provided with a resilient receiving socket —44— substantially like the bow receiving socket —3— for receiving the rear bow —45—, which is in construction substantially like the cross bow —34— or the cross bow —38— shown in Figures 12 and 13 respectively. The remaining cross bows —46—, —47— and —48— are of similar construction, but are connected to the side rail —39— with a modified form of bracket slip —49—. As indicated in Figure 19, the clip —49— is in the form of a flat strip of metal of about the width of one of the cross bows as —48—, and extends vertically and has its lower end secured to the side rail —39— in any suitable manner, and its upper end secured to the cross bow —48— in any suitable manner with the squared end of the bow resting in substantial contact with the upper edge of the rail —39— to form a rigid construction therewith.

A slightly modified form of rail receiving socket or channel iron —50— is indicated for connecting the outrigger bow —51— which may be of the same form and construction as the cross bow —48— to the free ends of the side rails —39—. This channel iron is formed of a strip of metal bent or otherwise shaped in U-shaped form and adapted to fit over the abutting ends of the rail —39— and the bow —51—, as best indicated in Figure 20.

Any means may be utilized for securing the outrigger bow and the side rails —39— to the channel iron 50. Preferably the flanges —52— of the channel iron are of substantially the same width as the rail —39— and fit tightly against its opposite upper and lower sides so as to leave unobstructed the longitudinal slot or opening between the spaced edges of the metal casing of the rail —11— or the rail 39, as the case may be.

Figure 21:
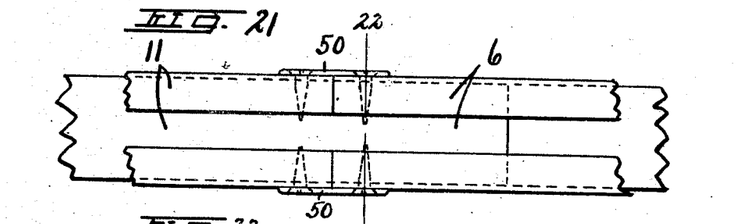
Figure 21 illustrates a modified method of securing together the abutting ends of the separate sectional side rails of Figures 1 and 2.
Figure 22:
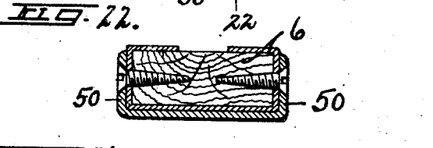
Figure 22 is a cross section on line 22—22, Figure 21.

In Figures 21 and 22, this same form of channel iron —51— is utilized for connecting the sections —6— and —11— and —11— and —12— of the side rails when such rail is formed in sections, the channel —50— being of any suitable length and fitting over the abutting ends of the rails as —6— and —11— and secured to each in any suitable manner, as by screws illustrated.

Figure 23:
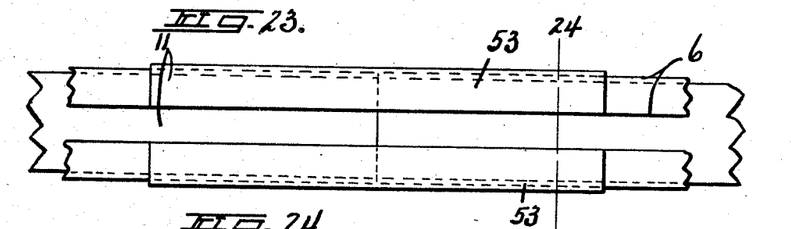
Figure 23 is a further modified form of the connecting means for the separate sections of Figures 1 and 2.
Figures 24, 25:
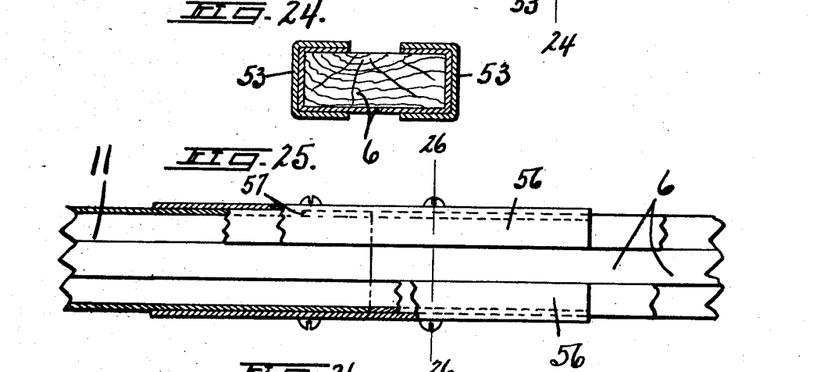
Figure 24 is a section on line 24—24, Figure 23.
Figure 25 illustrates a further modified form of connecting means for the separate sections of the structures of Figures 1 and 2.

In Figures 23 and 24 a two-part connecting means is shown in that, each part comprising a U-shaped metallic section —53— of a width suitable to receive the opposite edges of the rail and preferably with their opposite legs —54— of a length substantially equal to the width of the edge —55— of the casing of the rail of which the sections —6— and —11— are formed. These U-shaped members are fitted over the abutting ends of the sections —6— and —11— or —11— and —12— etc. and may be secured to both sections in any suitable manner, as by spot welding or otherwise to the metallic casing of the rail.

Figure 26:
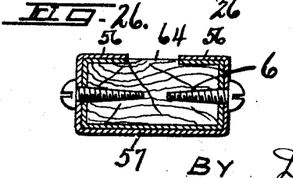
Figure 26 is a section on line 26—26, Figure 25.

In Figures 25 and 26 a somewhat different form is shown in that the side portions are provided for the rail socket —50— as illustrated in Figure 21 which extend downwardly over the incomplete side of the rail in the form of flanges —56— which terminate preferably adjacent the termination of the opposite spaced edges of the metallic casing of the section or rail —6—. There is thus formed a rail socket —57— that is in substantially the same form as the metallic casing of the rail. Its end is fitted over the ends of two abutting sections as —6— and —11— so that its longitudinal slot registers with the longitudinal slot between the spaced edges of the metallic casing of the rail itself. In this construction the wooden insert —13— may be raised at —64— so as to lie substantially flush with the surface of the metal casing of the rail as shown.

It will be apparent that the novel type of sheathed filler blocks embodied in the principal elements of my top structure, affords a number of important advantages over less completely encased filler blocks such as have been heretofore used. In my improved structure, all but one side of the respective filler blocks are completely encased by a continuous sheath strip and reenforced thereby, and this is further combined with the partial closure of said odd side of the filler by inturning both longitudinal edges of said sheath strip while allowing for a relatively narrow opening therebetween to give access to the filler block for tacking purposes. A substantially equilateral strength is thereby imparted to the reenforced filler elements and when thus constructed, the top structure is given a greater inherent capacity to endure severe torsional or other weaving strains without detrimental effects.

It will be obvious that many and various constructions may be utilized for connecting separate sections of my side rail and in its broader aspects, the present invention comprises a reenforced top structure having a main arm and an outrigger bow supported therefrom. Between these elements is disposed an intermediary sheathed side-rail structure, which may be either of the conventional bipartite pivotally stop-jointed type or of the sectional sleeved type such as has been more particularly disposed in the drawings, and altho I have shown and described specific constructions, forms and arrangements of parts as illustrative of perhaps preferred embodiments of my invention, I do not desire to limit myself to the details of form, construction or arrangement, as various changes may be resorted to without departing from the spirit and scope of the appended claims.

I claim:

1. A top structure having a main arm secured to a vehicle body and adapted to support an outrigger bow, an intermediary side rail structure comprising a plurality of substantially similar and aligned sections abutting end to end, each such section consisting of a continuous but incomplete metallic tubular sheath-like member having a plurality of sides, one of which is provided with a tacking slot whose width is less than that of said one odd side and which slot is faced outwardly with respect to the longitudinal center of the top structure, and sleeve means for connecting the adjacent sections.

2. A top structure having a main arm secured to a vehicle body and adapted to support an outrigger bow, an intermediary sectional side rail structure of substantially rectangular profile, and sleeve means for connecting the respective adjoining sections of the side rail structure, each such sleeve consisting of an incomplete metallic tubular member having a longitudinal slot therethrough and adapted to resiliently embrace more than three sides of said adjoining rails.

3. A top structure having a main arm secured to a vehicle body and adapted to support an outrigger bow, an intermediary side rail structure comprising a plurality of substantially similar sections abutting end to end, means for connecting the adjacent sections, each of said sections being in the form of a continuous but incomplete metallic tubular sheath-like member having a plurality of sides one of which is provided with a slot whose width is less than that of said one odd side, and a wood filler encased within each of said sheaths and exposed through the respective slots, said slots being aligned and faced outwardly with respect to the longitudinal center of the top structure.

4. A top structure having a main arm secured to a vehicle body, a sectional side rail structure secured to the main arm and extending forwardly therefrom over said body in a substantially horizontal plane; sleeve means for connecting the adjacent sections of the side rail structure, each of said sections being provided with a continuous metallic tubular sheath-like member of which all but one side are fully closed while said one side is incompletely closed by the respective inturned longitudinal edges of said sheath to form an access slot therebetween which is outwardly faced with respect to the longitudinal center of the top structure, and a wood filler encased within each of said sheaths and exposed through the respective slots.

5. A permanent top structure comprising a main arm and a sectional side rail forwardly disposed therefrom, said main arm and the side rail sections each comprising separate but similar continuous metallic tubular sheath-like members of substantially parallelogram cross-sectional profile of which three sides are closed while the fourth side thereof is incompletely closed to provide for an access opening therethrough which is faced outwardly relative to the longitudinal center of the top structure, and a wood filler exposed through said opening and encased in each of the respective sheaths.

6. A top structure comprising a set of main arms, a sectional side rail for each of the arms, an outrigger adapted to bridge the free ends of said sectional rails, each of the designated top elements consisting of a separate but similar continuous metallic tubular sheath-like member having a plurality of sides, one of which sides is provided with a relatively narrow slot for access purposes, sleeve means connecting the adjacent portions of the aforesaid elements together, and a separate wood filler exposed through and encased within the respective sheath members.

7. A permanent top structure comprising a main arm, a bracket plate secured to the upper portion of the main arm, a sheathed side rail provided with an access slot and having one end portion pivotally secured to said plate, a metallic sleeve serving to reenforce said rail slot, and a removable lock bolt for said other leg longitudinally spaced from the pivot and extending through said plate, said sleeve and said side rail to normally prevent pivotal movement between said arm and said rail.

8. A permanent top structure comprising a plurality of similarly formed sections of substantially rectangular profile abutting end to end, each provided with a continuous metallic tubular sheath-like member of which all but one side are fully closed while said one side is incompletely closed by the respective inturned longitudinal edges of said sheath to form an access slot therebetween, a wood filler encased within said section and exposed through the slot, and a metallic sleeve means serving to connect the respective adjacent section of the top structure.

9. A permanent top structure comprising a plurality of similarly formed sections comprising a rectangular sheet metal sleeve having a slot extending longitudinally of one side thereof, a wood filler encased within the sleeve exposed through the slot, certain of said sections having the wood filler reduced at the ends of the section and a metallic tie sleeve inserted in the recesses thus formed in the adjacent ends of two sections.

10. A permanent top structure comprising a plurality of similarly formed rectangular sections comprising an incomplete sheet metal tube having a slot extending longitudinally of one side thereof, a wood filler encased within the tube exposed through the slot, certain of said sections having the wood filler reduced at the ends of the section, a metallic tie sleeve inserted in the recesses thus formed in the adjacent ends of two sections, and a strap extending across the longitudinal slot in one of said sections and connected to the opposite spaced edges thereof to form a solid tubular portion.

11. In a top structure comprising a main arm adapted to support an outrigger bow, an intermediary composite sectional side rail forwardly disposed with respect to said arm, each said section being formed of a continuous elongated strip of sheet metal bent into tubular sheath-like shape of generally parallelogram cross sectional profile with its longitudinal edges inturned over the fourth side of said profile and spaced apart to form a continuous access slot extending along the entire length of said sectional rail and faced outwardly relative to the longitudinal center of the top structure, and a separate filler block encased within each of said incomplete sheaths and exposed through their respective slots for tacking purposes.

12. In a top structure comprising a main arm adapted to support an outrigger bow, an intermediary composite sectional side rail forwardly disposed with respect to said arm, each said section being formed of an elongated strip of sheet metal bent into a continuous but incomplete tubular sheath-like shape having a plurality of sides one of which is provided with a relatively narrow access slot disposed intermediate the longitudinal edges defining said one side and which slot is faced outwardly relative to the longitudinal center of the top structure, and a separate filler block disposed within each of said sheath sections and adapted to span the width of their respective slots for tacking purposes.

13. In a permanent top structure, a horizontally extending outrigger and a pair of complementary composite side rails therefor, said rails each comprising a filler block of substantially parallelogram profile provided with a peripherally incomplete metal sheath disposed to constitute an outwardly faced access slot, a separate stake pocket attached to the inner face of each rail sheath and offset therefrom to form a receiving socket, and a cross bow bridging said rails, the legs of said bow each having a shouldered filler part respectively resting upon the upper surface of the side rails with an extended portion projecting from the respective shoulders adapted to fit into said sockets.

14. A top structure adapted to cover a vehicle body and comprising a set of main arms, a pair of side rails and a cross bow therefor, each of said elements being formed of strips of sheet metal bent into continuous tubular form of substantially the same cross-sectional profile having a plurality of sides of which all but one side are fully closed while said one odd side is incompletely closed by the respective inturned longitudinal edges of said strip and adapted to form access slots therebetween which are all faced outwardly relative to the longitudinal center of the top structure, a filler block encased within each of said sheaths and exposed through the slot thereof for tacking purposes, means for connecting said elements together, and a cover fabric mounted upon said assembled structure and fastened to one or more of said respective filler blocks through their respective access slots.

15. In a top structure, a set of sectional composite side rails, a bow stake pocket carried by each of said rails, a filler encased cross bow mounted in said pockets, said bow comprising a continuous strip of sheet metal bent into substantially tubular form about its wood filler, said filler being provided with a plurality of sides of which all but one are fully encased while said one odd side is partially encased by both of the respective inturned longitudinal edges of said strip to constitute an access slot therebetween which slot is faced outwardly relative to the longitudinal center of the top structure.

16. In a top structure, a pair of complementary composite sectional side rails each comprising a filler block and a sheath therefor having an outwardly faced access slot, a bow-stake pocket for each of said rails, and a cross-bow mounted in said pockets and bridging the rails, said bow comprising a continuous sheath strip of sheet metal bent into substantially parallelogram profile having the longitudinal edges thereof inturned to partially form the fourth side of said tube and spaced apart to form an access slot extending longitudinally of the bow, and wood fillers exposed through said bow slot for tacking purposes.

17. In a top structure, a pair of complementary sectional side rails each having a flat top surface and comprising a filler block and an incomplete sheath therefor providing for an outwardly faced access slot, a bow-stake pocket for each of said rails, and a cross bow mounted in said pockets and bridging the rails, said bow being provided with a filler block and a continuous strip of sheet metal of substantially parallelogram profile adapted to sheath more than three sides of said filler with the longitudinal edges of said strip spaced apart to form an access slot for the bow, and squared ends for the legs of said bow attached to and resting upon the flat top surface of the respective side rails.

18. In a top structure comprising an outrigger and a pair of main arms, a set of intermediary composite rail sections adapted to support the ends of said outrigger bow, said rails each comprising a filler block and a sheath therefor having an outwardly faced access slot, a filler encased cross bow bridging said rails, said cross bow comprising a longitudinally continuous but peripherally incomplete metallic sheath member having a plurality of sides with an access slot through one of the sides thereof, said slot being substantially narrower than the width of said one side and adapted to expose the filler for tacking purposes.

19. A non-collapsible frame structure for a vehicle top comprising a supporting standard disposed at each side of the body, an angular or bifurcated bracket plate for each of said standards, said plate having one of its legs secured to its respective standard, complementary composite side rails secured respectively to the other legs of said bracket plates, said rails each comprising a filler block and a peripherally incomplete sheath therefor provided with an access gap faced outwardly with respect to the top, a bow receiving socket for each of said standards secured to the respective bracket plates, and a rear bow bridging said standards having the legs thereof mounted in the respective sockets.

20. A non-collapsible frame structure for a vehicle top comprising a supporting standard disposed at each side of the body, an angular or bifurcated bracket plate for each of said standards, said plate having one of its legs secured to its respective standard, complementary side rails secured respectively to the other legs of said bracket plates, each set of standards and rails therefor being disposed upon the same side of their respective plates, a bow receiving socket secured to each bracket plate on the rail side thereof, and a rear bow bridging said standards having the legs thereof mounted in the respective sockets.

In witness whereof I have hereunto set my hand this 4th day of May, 1923.

CHARLES C. EDDY.